United States Patent [19]

Conner, Jr. et al.

[11] 4,450,445

[45] May 22, 1984

[54] RANGE RATE DEPENDENT PULSE CONTROL APPARATUS AND METHOD THEREFOR

[75] Inventors: Leo B. Conner, Jr., Phoenix; Robert N. Nelson, Scottsdale, both of Ariz.

[73] Assignee: Motorola Inc., Schaumburg, Ill.

[21] Appl. No.: 305,562

[22] Filed: Sep. 25, 1981

[51] Int. Cl.$^3$ .............................................. G01S 9/02
[52] U.S. Cl. ..................................... 343/7.5; 343/7.3
[58] Field of Search ..................... 343/7.5, 7.3; 367/95

[56] References Cited

U.S. PATENT DOCUMENTS 3,614,719 10/1971 Treacy .................................. 367/95
4,063,238 12/1977 Conner, Jr. .......................... 343/7.3

Primary Examiner—Maynard R. Wilbur
Assistant Examiner—M. R. Gordon
Attorney, Agent, or Firm—Eugene A. Parsons

[57] ABSTRACT

A pulse width and amplitude control apparatus wherein an analog Doppler to digital pulse converter provides pulses to the up input of an up/down counter in the presence of a noise input or a Doppler input, and a second analog Doppler to digital pulse converter applies pulses with greater frequency to the down input of the up/down counter when a Doppler signal exceeding a predetermined threshold is present, so that a low or no signal condition increases and a high signal condition decreases the transmit pulse envelope.

12 Claims, 3 Drawing Figures

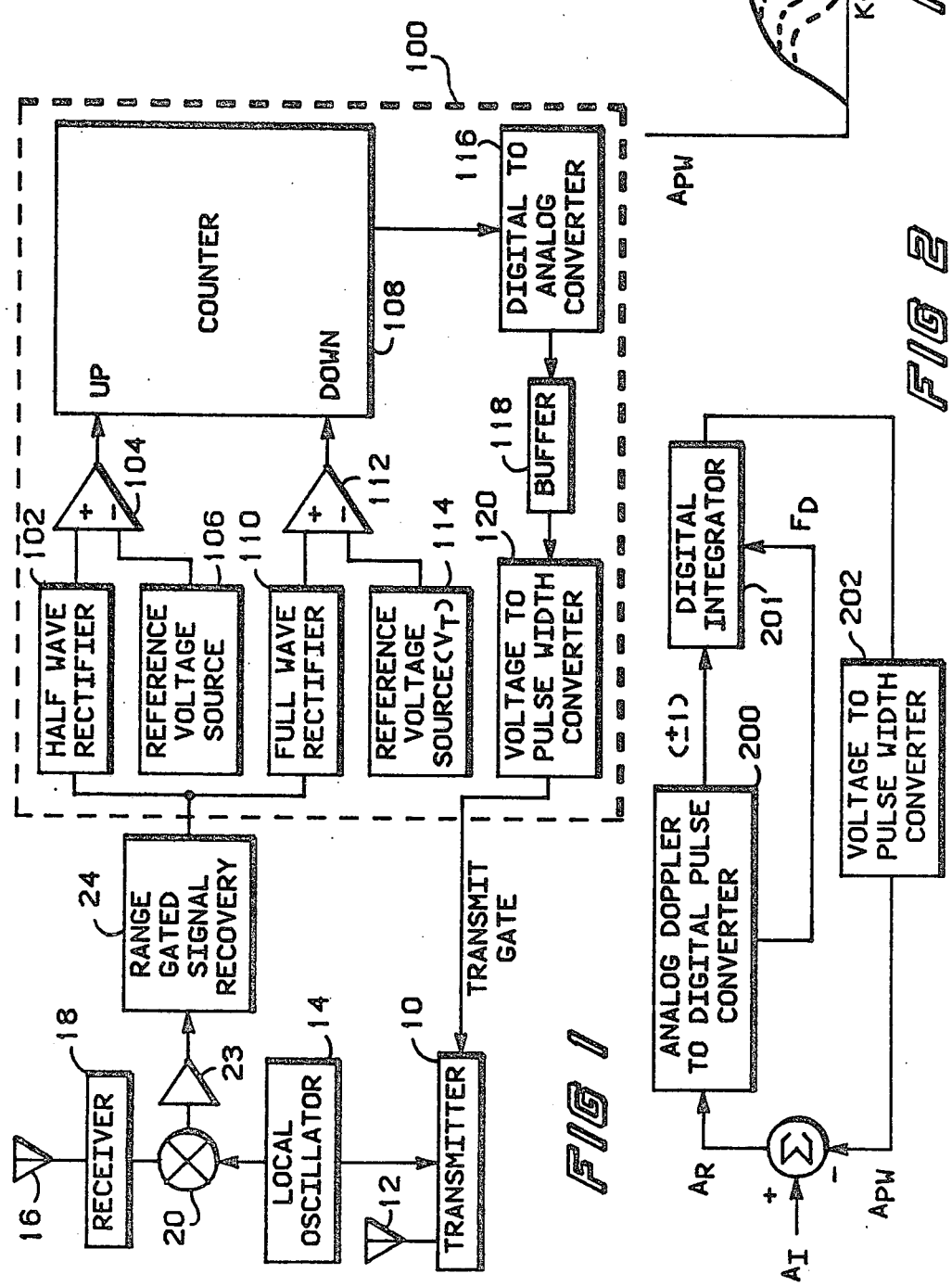

RANGE RATE DEPENDENT PULSE CONTROL APPARATUS AND METHOD THEREFOR

FIELD OF THE INVENTION

The present invention pertains to systems for controlling the amplitude and width of Doppler radar pulses and in particular to range rate dependent pulse width and amplitude control apparatus, referred to hereafter as pulse control apparatus.

In Doppler radars including a transmitter which periodically transmits pulses of electrical energy and a receiver which receives reflected portions of the energy of the transmitted pulses from moving targets and removes the carrier so that only the change of frequency is available, the signal provided by the receiver is called a bipolar video, or reflected, pulse train. Some range tracking apparatus sample the bipolar video pulse train by means of a circuit which is controlled by a range gate. The sampled signals are detected and filtered and then used as part of an error signal in a conventional servo loop to control position of the range gate. If the filter time constants are reduced very far, the loop becomes unstable, but large time constants result in range errors which are largely dependent on the velocity or acceleration of the target.

Furthermore, when tracking an inbound target, the signal level increases as 1/range$^4$. For short range tracking high signal levels typically overdrive the receivers and result in saturation, which precludes further tracking. On the other hand, the use of large transmit pulse widths is desirable for tracking at maximum range because this results in greater average signal power which, in turn, means a higher signal-to-noise ratio. However, such use conflicts with the desire to provide very short range tracking as well, because the width of the transmit pulse limits short range tracking performance.

In one approach to this dilemma, illustrated in U.S. Pat. No. 3,611,370, issued to Lawrence R. Frasure et al, on Oct. 5, 1971, a long range, interrupted continuous wave mode and a short range, Bessel sideband FM continuous wave mode are employed. Such a system inherently suffers from delays and instabilities in the zone in which switching takes place. Further, a dual system requires greater size, complexity and expense than a single system.

Another approach described in U.S. Pat. No. 3,739,379, issued to Donovan C. Davis on June 12, 1973, maintains a fixed ratio of pulse width to interpulse period and, hence, to pulse repetition frequency. Integrators are used to control the pulse repetition frequency so that at most only the first ten percent of the leading edge of the return pulse is passed by the range gate. Thus, the pulse width control loop is updated at the rate of a long time average of the Doppler amplitude. As a result, in this system the altitude measurement error increases as the ascent or descent rate increases due to the delay of the integrators.

Other schemes are generally time dependent and require switched filters to operate over a wide dynamic range of velocities. Such schemes suffer from problems of delay, complexity and expense.

SUMMARY OF THE INVENTION

Accordingly, it is an object of the present invention to provide a new and improved RF pulse control apparatus.

It is a further object to provide a new and improved pulse control apparatus which operates in the space domain to provide an adaptive pulse control over a wide range of dynamic velocities without the use of switched filters.

Yet another object is to provide a new and improved pulse control apparatus wherein the control function tracks slow and fast targets equally well.

Still another object is to provide a new and improved method for range rate dependent control of pulse width and amplitude.

These and other objects and advantages of this invention will become apparent to those skilled in the art upon consideration of the accompanying specification, claims, and drawings.

In order to attain the above-mentioned and other objects and advantages, the present invention comprises a means for providing pulses only when signals present in a Doppler radar receiver exceed a predetermined threshold, which means for providing pulses drives a means for counting pulses to cause the width and amplitude of the pulses emitted by a Doppler radar transmitter to be varied by fixed increments in response to each pulse.

BRIEF DESCRIPTION OF THE DRAWINGS

FIG. 1 is a block diagram of a device embodying the present invention;

FIG. 2 is a simplified block diagram of pulse control loop functions representative of the present invention; and FIG. 3 depicts various transmit pulse envelopes for various pulse widths obtainable through the use of the present invention.

DESCRIPTION OF THE PREFERRED EMBODIMENT

In a preferred embodiment of the present invention as illustrated in FIG. 1, a Doppler radar transmitter 10 emits a short burst of radio frequency energy at regular intervals. The frequency of the pulses is controlled by a coherent local oscillator 14. This radio frequency energy is radiated by an antenna 12. If the transmitted signal is reflected by a moving target, the energy returned to receiving antenna 16 will be shifted in frequency by the amount of the Doppler shift, $F_D$, which is dependent on the relative radial velocity between the radar and the reflecting target. The received signal is conditioned in receiver 18 and applied to one port of a mixer 20. In mixer 20, the received signal is mixed with a signal from local oscillator 14 to remove the radio frequency and to provide an output signal containing a frequency proportional to the speed of the target. The signal at the output of the mixer is a train of video reflected pulses the amplitude and polarity of which is modulated at the Doppler rate, $F_D$. These pulses are next amplified by a video amplifier 23 to a convenient level for further signal processing. This sequence of Doppler modulated video pulses is then applied to a range gated signal recovery circuit 24, which comprises, for example, a range gated sample and hold circuit followed by a low pass filter and which may be of the sort described in U.S. Pat. No. 4,063,238, issued to Leo B. Conner, Jr., on Dec. 13, 1977, assigned to the same assignee. The output from circuit 24 is a sinusoid the frequency of which is the Doppler frequency, $F_D$. The amplitude of this output will vary with the size of the moving target and the distance between the target and the radar receiving antenna 16. The operation of a pulse Doppler radar is well-known to those skilled in the art and is illustrated here in very simplified block form only to place the present invention in the proper environment. It will be further understood by those skilled in the art that many variations and alterations of the foregoing are, or may become, available.

Signals from circuit 24 are applied within a pulse control apparatus 100 to a half wave rectifier 102 and to a full wave rectifier 110. The output of half wave rectifier 102 is applied to one input of a two input comparator 104. The other input to comparator 104 is coupled to a reference voltage source 106 which establishes a theshold voltage which can be at the level of zero volts. The output of comparator 104 is applied to the up input of an up/down counter 108.

The output of full wave rectifier 110 is applied to one input of a two input comparator 112. A reference voltage source 114, which establishes a threshold voltage, $V_T$, is coupled to the other input of comparator 112. $V_T$ is sufficiently greater than the voltage set by source 106 so that noise only input will exceed the voltage set by source 106 but $V_T$ is exceeded only when a signal is present. The output of comparator 112 is applied to the down input of counter 108. The output of counter 108 is applied to the input of digital to analog converter 116, the output of which is applied to buffer 118. The output of buffer 118 is passed to a voltage to pulse width converter 120 which supplies a transmit gate to transmitter 10.

Where there is no reflected signal input, the output of the combination of elements 102, 104, and 106 is a series of logic level pulses whose characteristics are determined by the statistics of the noise voltage present at comparator 104. The average pulse rate will be proportional to the equivalent noise bandwidth of the Doppler filter of circuit 24, which precedes rectifier 102. When a reflected signal is present, the output is a series of pulses whose rate is equal to $F_D$, the Doppler frequency.

The output of the combination of elements 110, 112, and 114 is a logical 0 if the peaks of the signal applied to rectifier 110 are below the threshold, $V_T$. The output is a series of logic level pulses at a rate of two times $F_D$ when the peak amplitude of the signal exceeds the threshold voltage, $V_T$.

The logic level pulses from elements 104 and 112 are integrated by counter 108 and then fed to converter 116 to produce an analog voltage proportional to the digital word stored in the up-down counter 108. This voltage is buffered in element 118 and then sent to a voltage-to-pulse width converter 120 which translates the applied input voltage into a transmit enable gate having a gate width proportional to the input voltage. This transmit enable gate sets the duration of the radio frequency transmit pulse and concommitantly the amplitude of the radio frequency pulse envelop is also controlled. As illustrated in FIG. 3, where $A_{PW}$ is the feedback amplitude and $K_{VPW}$ is the voltage-to-pulse amplitude scale factor, a range of transmit pulse envelopes is obtainable by use of the present invention.

One advantage of the present invention is that its operation is amplitude and space domain dependent as opposed to being amplitude and time domain dependent, thereby avoiding the usual problems associated with time domain systems which are required to operate over a wide dynamic range of target radial velocities. The spatial dependency of the pulse control loop of the present invention is derived from the fact that for a given transmit frequency, $F_O$, one cycle of a Doppler sinusoid is produced at the receiving radar for each wavelength of round trip (out and back) range change between the radar and the approaching or receding moving target. It is this feature which is exploited by the present invention to produce the adaptive response of the pulsewidth control apparatus. By including a threshold feature, the operation of the present invention is made to be conditional in that pulse width and amplitude are only reduced if a predetermined signal-to-noise ratio is available at the processor output.

FIG. 2 is a simplified functional block diagram depicting features of the pulse control loop embodied in the present invention. In the approximating equations which describe this loop, where $A_R$ is the amplitude of the signal passed to the pulse control apparatus 100, $A_I$ equals the input amplitude and $A_{PW}$ is the feedback amplitude, $$A_R + A_I - A_{PW}.$$

The gain of digital integrator 201 illustrated in FIG. 1 by elements 108, 116 and 118, is proportional to the recovered Doppler frequency, $F_D$. This implementation will either cause up/down counter 106 to count up or to count down depending on the pulse rates of the two clock inputs from elements 104 and 112. Therefore, the digital integrator gain factor, $K_I$, is proportional to the Doppler frequency such that where K is the scale factor of digital to analog converter 116, and N is the number of bits in up/down counter 108, K/N is the digital integrator scale factor, so that $$K_I = \frac{(K)F_D}{N}.$$

Where 1/S is the digital integrator transfer function, the S-domain transfer function, $H_I(S)$, can be approximated by $$H_I(S) = \frac{(K)F_D}{(N)S}.$$

Elements 102, 104, 106, 110, 112, and 114 of FIG. 1 are encompassed within the analog to digital pulse converter block 200 of FIG. 2. This block can be considered to be a unity drive signal which changes polarity with $A_R$ and which provides Doppler rate data to control the gain of a digital integrator 201. Since the frequency dependency is accomplished in the digital integrator block 201 and the amplitude information is only used to activate the pulse control loop, the function of block 200 can be adequately modeled as either a plus or minus unity input to the digital integrator 201 for the cases where some signal is present. In the case of noise only input, a constant which represents the integrator slew rate when driven by the noise pulses is adequate.

Where $K_{VPW}$ is the voltage-to-pulse amplitude scale factor, $$A_{PW} = \frac{A_R (K) (F_D) (K_{VPW})}{N(S)}.$$

Therefore, $$A_{PW} = \frac{(A_I - A_{PW}) (K) (K_{VPW}) (F_D)}{N(S)}.$$

Letting $$\frac{K (K_{VPW})}{N} = K_O,$$

it follows that $$A_{PW}\left(1 + \frac{K_O F_D}{S}\right) = \frac{A_I (K_O) (F_D)}{S}.$$

Where H(S) is the S-domain transfer function for the system of FIG. 2, $$H(S) = \frac{A_{PW}}{A_I} = \frac{\frac{K_O F_D}{S}}{1 + \frac{K_O F_D}{S}} = \frac{K_O F_D}{S + K_O F_D}.$$

H(S) can thus be seen to be a simple low pass filter with a pole located at $$W_{3dB} = K_O F_D.$$

Thus, the response of the system is seen to be directly proportional to the Doppler frequency, $F_D$.

In the operation of the present invention, where only noise is present at the input of pulse control apparatus 100, comparator 112 has no output because the noise only input is not sufficient to overcome the threshold, $V_T$. Comparator 104 produces noise pulses with an average rate proportional to the noise bandwidth of the input Doppler signal. This set of conditions causes up/down counter 108 to count up to full scale and deadend. This represents the maximum pulse width and amplitude condition.

Where an input Doppler signal is above the noise level, but below the threshold setting, $V_T$, on comparator 112, comparator 112 is quiet and comparator 104 produces counts at the Doppler rate, $F_D$. This drives up/down counter 108 upward toward the maximum output condition.

Where the input Doppler signal is sufficient to overcome the threshold setting on comparator 112, both comparators yield pulse trains, the number of pulses from comparator 104 being proportional to $F_D$, the Doppler frequency, and the number of pulses from comparator 112 being proportional to two times $F_D$, so that the net count into up/down counter 108 will represent a down count at the Doppler rate, $F_D$. This condition causes the transmitter pulse width to be driven toward the minimum pulse width and amplitude condition until the signal level drops below the threshold of comparator 112 or until up/down counter 108 deadends at the opposite end of its dynamic range.

The fact that the present invention is always updated at the Doppler rate allows for equally good tracking of fast or slow targets. Furthermore, the present invention avoids the complication and delay associated with the use of switched filters.

While the present invention has been described in terms of a preferred embodiment, further modifications and improvements will occur to those skilled in the art. I desire it to be understood, therefore, that this invention is not limited to the particular form shown and I intend in the appended claims to cover all such equivalent variations which come within the scope of the invention as described.

What is claimed is:

1. In a Doppler radar having a transmitter for periodically transmitting pulses of electrical energy and a receiver for receiving reflected portions of energy of the transmitted pulses, a pulse control apparatus comprising:
    first means for providing pulses only when a predetermined threshold is exceeded having an input and an output, said input being responsive to signals present in the receiver;
    second means for providing pulses only when a predetermined threshold is exceeded having an input and an output, said input being responsive to signals present in the receiver; and
    means for counting pulses having a first input coupled to said output of said first means for providing pulses, said means for counting pulses having a second input coupled to said second means for providing pulses such that said first means for providing pulses increases the width and amplitude of the pulses transmitted by the transmitter by a first fixed increment and said second means for providing pulses decreases the width and amplitude of the pulses transmitted by the transmitter, by a second fixed increment, said first means for counting pulses providing an output for determining the width and amplitude of pulses transmitted by the transmitter.

2. The pulse control apparatus as recited in claim 1 wherein said means for counting pulses comprises an up/down counter.

3. The pulse control apparatus as recited in claim 1 wherein said first fixed increment by which said first means for providing pulses increases the pulse width and amplitude is less than said second fixed increment by which said second means for provding pulses decreases the pulse width and amplitude.

4. The pulse control apparatus as recited in claim 1 wherein said first means for providing pulses comprises:
    a half wave rectifier having an input responsive to signals present in the receiver and having an output; and
    a first comparator having a first input coupled to said output of said half wave rectifier having a second input suitable for application of a first reference voltage, and having an output coupled to said first input of said means for counting pulses; and
    wherein said second means for providing pulses comprises:
    a full wave rectifier having an input responsive to signals present in the receiver and having an output; and
    a second comparator having a first input coupled to said output of said full wave rectifier having a second input suitable for application of a second reference voltage, and having an output coupled to said second input of said means for counting pulses.

5. The pulse control apparatus as recited in claim 1 wherein said means for counting pulses further comprises:
- a digital to analog converter having an output and having an input coupled to said output of said means for counting pulses;
- a buffer having an output and having an input coupled to said output of said digital to analog converter; and
- a voltage to pulse width converter having an input coupled to said output of said buffer and having an output for applying a transmit gate to said transmitter.

6. A Doppler radar having a transmitter for periodically transmitting pulses of electrical energy and a receiver for receiving reflected portions of energy of the transmitted pulses, comprising in combination:
- a pulse transmitter having a first and second input and an output;
- a transmitting antenna receiving output from said transmitter;
- a receiving antenna providing an output;
- a receiver coupled to said output of said receiving antenna, said receiver having an output;
- a coherent local oscillator having a first output and a second output, said first output being coupled to said first input of said transmitter;
- a mixer having an output and having a first and a second input, said first input being coupled to said output of said receiver, said second input being coupled to said second output of said coherent local oscillator;
- a video amplifier having an output and having an input coupled to said output of said mixer;
- range gated signal recovery apparatus having an output and having an input coupled to said output of said video amplifier;
- first means for providing pulses only when a predetermined threshold is exceeded having an input coupled to said output of said range gated signal recovery apparatus and having an output;
- second means for providing pulses only when a predetermined threshold is exceeded having an input and an output, said input being responsive to signals present in the receiver; and
- means for counting pulses having a first input coupled to said output of said first means for providing pulses, said means for counting pulses having a second input coupled to said second means for providing pulses such that said first means for providing pulses increases the width and amplitude of the pulses transmitted by the transmitter by a first fixed increment and said second means for providing pulses decreases the width and amplitude of the pulses transmitted by the transmitter by a second fixed increment, said means for counting pulses providing an output coupled to said second input of said transmitter.

7. The Doppler radar as recited in claim 6 wherein said means for counting pulses comprises an up/down counter.

8. The Doppler radar as recited in claim 6 wherein said first fixed increment by which said first means for providing pulse increases the pulse width and amplitude is less than said second fixed increment by which said second means for providing pulses decreases the pulse width and amplitude.

9. The Doppler radar as recited in claim 6 wherein said first means for providing pulses comprises:
- a half wave rectifier having an input responsive to signals present in the receiver and having an output; and
- a first comparator having a first input coupled to said output of said half wave rectifier having a second input suitable for application of a first reference voltage, and having an output coupled to said first input of said means for counting pulses; and wherein said second means for providing pulses comprises:
- a full wave rectifier having an input responsive to signals present in the receiver and having an output; and
- a second comparator having a first input coupled to said output of said full wave rectifier having a second input suitable for application of a second reference voltage, and having an output coupled to said second input of said means for counting pulses.

10. The Doppler radar as recited in claim 6 wherein said means for counting pulses further comprises:
- a digital to analog converter having an output and having an input coupled to said output of said means for counting pulses;
- a buffer having an output and having an input coupled to said output of said digital to analog converter; and
- a voltage to pulse width converter having an input coupled to said output of said buffer and having an output for applying a transmit gate to said second input of said transmitter.

11. A method for controlling the width and amplitude of transmitted pulses in a Doppler radar having a transmitter for periodically transmitting the transmitter pulses of electrical energy and a receiver for receiving reflected portions of electrical energy of the transmitted pulses, comprising the steps of:
- providing a signal from the receiver:
- using said signal to generate counter pulses indicative of crossings of a predetermined threshold by said signal;
- counting said counter pulses to generate a count; and
- determining width and amplitude of the transmitted pulses by using said count from said counting step for gating the transmitter.

12. The method for controlling the width and amplitude of transmitted pulses as recited in claim 11 wherein:
- said using step comprises generating a first counter pulse train indicative of the presence of any signal from the receiver, and generating a second counter pulse train indicative of the presence of reflected portions of the transmitted pulses at the receiver; and
- said counting step comprises counting up and counting down wherein said counting up causes an increase in width and amplitude of the transmitted pulses, and wherein said counting down causes a decrease in width and amplitude of the transmitted pulses.

* * * * *